United States Patent [19]

Foster

[11] Patent Number: 4,821,868

[45] Date of Patent: * Apr. 18, 1989

[54] DRIVE/FRAME ASSEMBLY FOR A RECIPROCATING FLOOR

[76] Inventor: Raymond K. Foster, P.O. Box 1, Madras, Oreg. 97741

[ * ] Notice: The portion of the term of this patent subsequent to Dec. 15, 2004 has been disclaimed.

[21] Appl. No.: 905,370

[22] Filed: Sep. 8, 1986

[51] Int. Cl.[4] .................. B65G 25/04; F01B 15/00
[52] U.S. Cl. .................. 198/750; 92/151; 414/509; 414/525.9; 91/176; 91/178
[58] Field of Search .................. 198/750; 414/525 B, 414/525 R, 509; 92/151, 117 A; 91/176, 178, 189 R

[56] References Cited

U.S. PATENT DOCUMENTS

| | | | |
|---|---|---|---|
| 1,977,696 | 10/1934 | Purdy | 198/218 |
| 2,550,925 | 5/1951 | Weimar | 309/4 |
| 2,629,504 | 2/1953 | Peterson | 214/83.3 |
| 2,973,856 | 3/1961 | Brooks | 198/219 |
| 3,534,875 | 10/1978 | Hallstrom, Jr. | 214/83.3 |
| 3,783,620 | 1/1974 | Moe | 92/151 |
| 3,905,290 | 9/1975 | Caughey | 100/215 |
| 4,143,760 | 3/1979 | Hallstrom | 198/750 |
| 4,144,963 | 3/1979 | Hallstrom | 198/750 |
| 4,184,587 | 1/1980 | Hallstrom | 198/750 |
| 4,212,243 | 7/1980 | Haegermann | 92/151 |
| 4,474,285 | 10/1989 | Foster | 198/750 |
| 4,492,303 | 1/1985 | Foster | 198/750 |
| 4,508,211 | 4/1985 | Foster | 198/750 |
| 4,580,678 | 4/1986 | Foster | 198/750 |
| 4,712,467 | 12/1987 | Foster | 91/176 |

FOREIGN PATENT DOCUMENTS

| | | |
|---|---|---|
| 1296087 | 5/1969 | Fed. Rep. of Germany . |
| 2712449 | 9/1978 | Fed. Rep. of Germany ........ 92/151 |
| WO8403686 | 9/1984 | PCT Int'l Appl. .................. 198/750 |

Primary Examiner—Bruce M. Kisliuk
Attorney, Agent, or Firm—Delbert J. Barnard

[57] ABSTRACT

Piston rods (60, 62) of three linear hydraulic motors (36, 38, 40) are connected at their outer ends (64, 68) to two spaced apart transverse frame members (10, 12). A cylinder housing (72) is driven back and forth along each pair of piston rods (60, 62). Three transverse drive beams (48, 50, 52) are provided. Each drive beam (48, 50, 52) is directly connected to an associated one of the cylinder housings (72). Three sets of floor slat members (1, 2, 3) are provided. Each set (1, 2, 3) is connected to an associated one of the transverse drive beams (48, 50, 52). The linear hydraulic motors (36, 38, 40) are operated for moving the floor slat members (1, 2, 3) in one direction, for advancing a load, and for retracting them in the opposite direction. Each cylinder housing (72) has four fluid chambers (82, 84, 86, 88). The first and third chambers (82, 86) are interconnected and the second and fourth chambers (84, 88) are interconnected. This arrangement provides adequate force producing area with a relatively small diameter cylinder housing (72). Fluid passageways (110, 112) are formed in the piston rods (60, 62). Transfer valves (138, 140) and U-shaped tubes (134, 136, 126, 128) are clamped onto the outer end portions of the piston rods (60, 62) by means of a pair of clamp plates (190, 192, 214, 224) and interconnecting nut and bolt assemblies (194, 226).

16 Claims, 8 Drawing Sheets

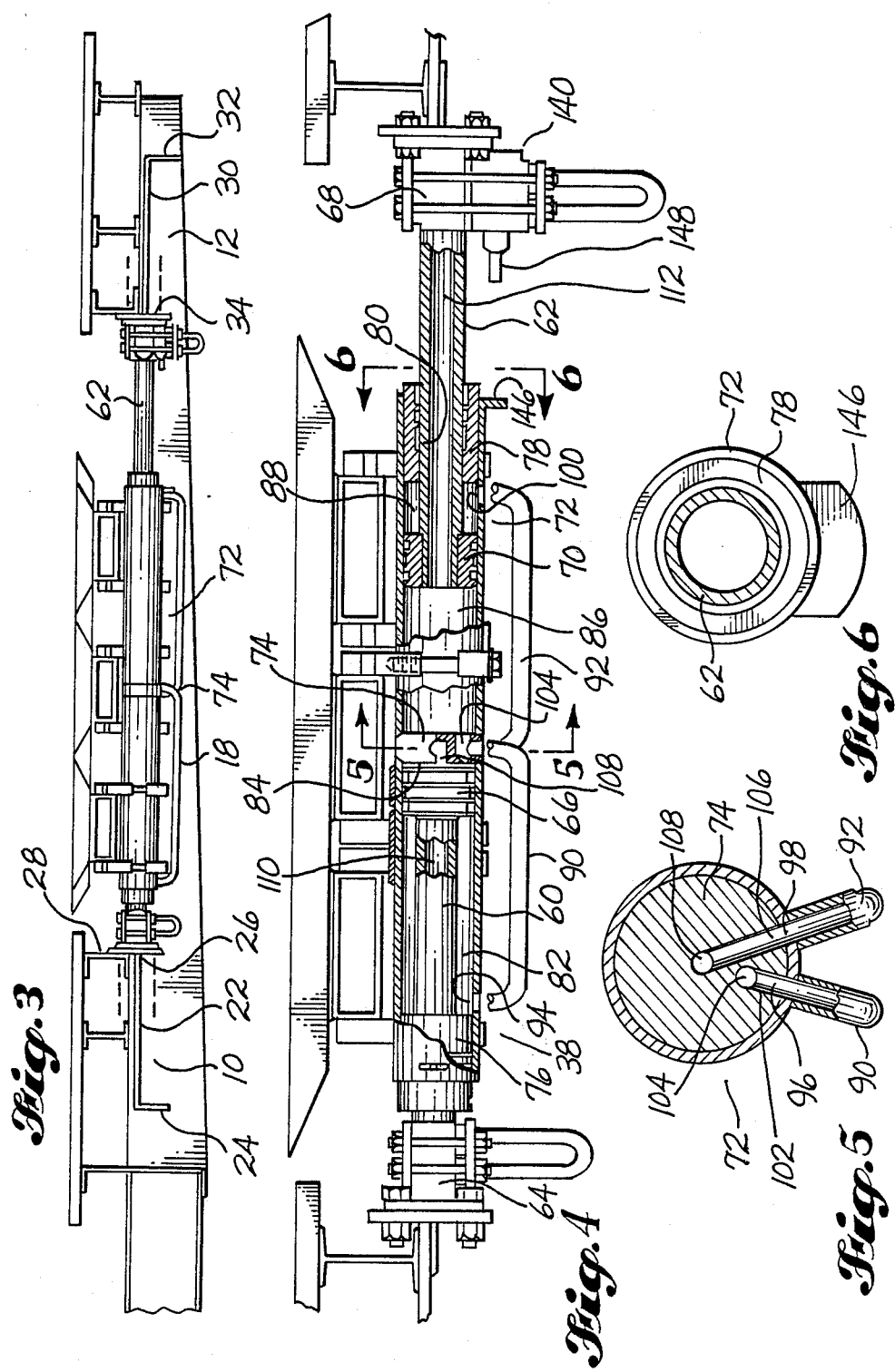

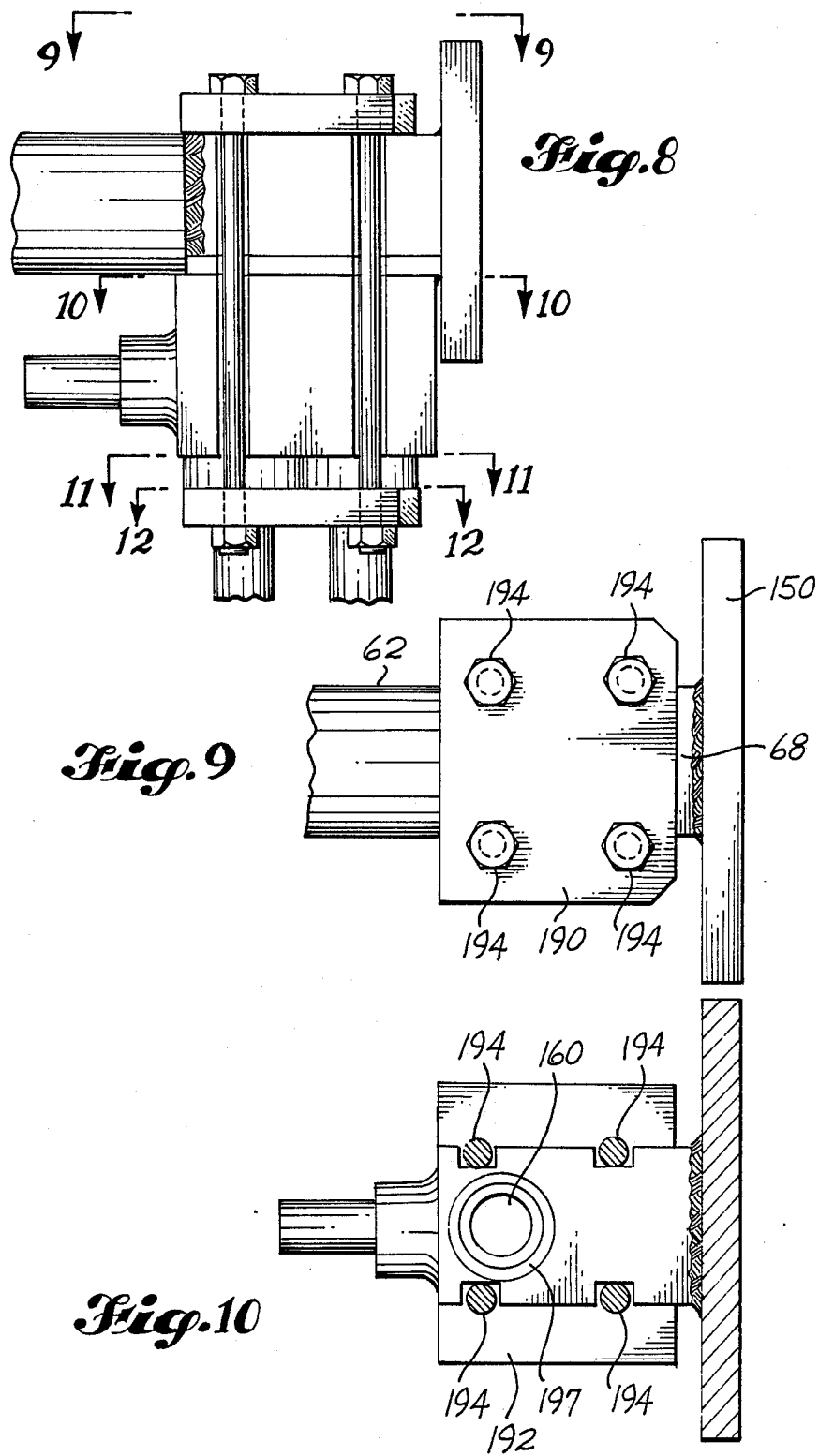

4,821,868

DRIVE/FRAME ASSEMBLY FOR A RECIPROCATING FLOOR

TECHNICAL FIELD

This invention relates to improvements in reciprocating floor conveyors, and in particular to the provision of a smaller size and lighter weight hydraulic drive and support frame assembly.

BACKGROUND ART

Reciprocating floor conveyors are a relatively recent developement. Basically, they comprise at least one group of at least three elongated floor members and a hydraulic drive system which operates to drive at least a majority of the floor members in unison in the desired conveying direction, and to retract them individually. Systems are in use in which all of the floor members are driven in unison, in the desired conveying direction, and are then individually retracted sequentially. It is also been proposed to drive a majority of the floor slat members in the desired conveying direction while at the same time retracting the remaining floor slat members. The present invention has application with both types of systems.

For background purposes, reference is made to U.S. Pat. No. 4,143,760, granted Mar. 19, 1979; U.S. Pat. No. 4,144,963, granted Mar. 30, 1969; U.S. Pat. No. 4,184,587, granted Jan. 22, 1980; all to Olaf A. Hallstrom. Reference is also made to my U.S. Pat. Nos. 4,474,285; 4,492,303; 4,508,211; 4,580,678; and to my copending application Ser. No. 477,767 Reduced Size Drive/Frame Assembly for Reciprocating Floor Conveyor, filed Dec. 11, 1984. Application Ser. No. 477,767 now abandoned was published under the Patent Cooperation Treaty as International Publication No. WO84,03686, on Sept. 27, 1984. The system is also prior art by the fact of its commercial sale and use.

Earlier forms of reciprocating floor conveyors are disclosed by U.S. Pat. No. 2,629,504, granted in February of 1953 to Peterson; by U.S. Pat. No. 2,973,856, granted in March of 1961 to Brooks; by U.S. Pat. No. 3,534,875, granted in October of 1970 to Hallstrom; by U.S. Pat. No. 3,905,290, granted September 16, 1975 to Robert A. Caughey; and by West German Patent Publication No. 1,296,087, published in May of 1969. These, patents are not particularly pertinent to the subject invention and require no further comment.

DISCLOSURE OF THE INVENTION

The present invention provides a relatively small and light weight modular type drive assembly.

The drive assembly of the present invention is basically characterized by a plurality of reversible linear hydraulic drive units, one for each set of floor slat members. Each drive unit comprises a pair of piston rods, each of which is mounted at its outer end to a frame and each of which carries a piston head at its inner end, and a cylinder housing mounted to reciprocate back and forth on the piston heads. When installed, the piston rods are fixed and the cylinder housings are movable. A transverse drive beam is associated with each cylinder housing. Each transverse drive beam is connected to its set of floor slat members and is also connected to the moving cylinder housing of its hydraulic drive unit.

The cylinder housing includes an end member at each of its ends. Each end member includes a central opening through which the piston rod at such end extends. The cylinder housing further includes a divider wall between its ends. A first fluid chamber is formed within the cylinder housing between a first end member and a first piston head. A second fluid chamber is formed within the cylinder housing between the first piston head and the divider wall. A third fluid chamber is formed within said cylinder housing between said divider wall and the second piston head. A fourth fluid chamber is formed within the cylinder housing between the second piston head and the second end member.

The divider wall includes a first passageway having an inner end communicating with said third chamber and an outer end. The divider wall also includes a second passageway having an inner end communicating with the second chamber, and an outer end. A first conduit means extends through the first piston rod. It includes an inner end in communication with the second chamber, and an outer end. A second conduit is interconnected between the first chamber and the outer end of the first passageway in the divider wall. A third conduit means is interconnected between the outer end of the second passageway and the divider wall and the fourth chamber. A fourth conduit means extends through the second piston rod and has an inner end in communication with the third fluid chamber, and an outer end.

In preferred form, each piston rod has a mounting pad at its outer end. The outer end of the first conduit means opens laterally of the first piston rod, at a location spaced inwardly from the mounting pad. The outer end of the fourth conduit means opens laterally from the second piston rod, at a location spaced inwardly from the second mounting pad.

In preferred construction, the cylinder housing is constructed in two sections, each with an inner end. The divider wall is a member between the two sections, to which the inner ends of the two sections are joined.

In preferred form, the second and third conduit means are sections of rigid tubing welded at their ends to the cylinder housing.

The construction of the piston rod in two parts, and the division of the cylinder housing into four chambers, connected together in pairs, results in a hydraulic unit which is relatively small and light weight, and strong, for the amount of force which it can produce. The tubular construction of the piston rods increases their strength in comparison to solid rods. The interconnection of the first and third chambers and the interconnection of the second and fourth chambers makes it possible to use a reduced diameter drive unit while still maintaining a substantial area against which the hydraulic fluid can act, for moving the cylinder housing in either direction. In each direction of travel the effective area is the area of the divider wall plus the area of the inner end of one of the end members.

The use of the piston rods as fluid passageways makes it possible to greatly simplify the plumbing together of a plurality of the drive units to form the drive assembly. It allows the use of short rigid tubes at the outer ends of the piston rods, and an easy to assemble and disassemble manner of connecting the tubes to the piston rod.

In accordance with an aspect of the invention, transfer valves are attached to end portions of some of the piston rods. The transfer valve of the invention is characterized by a housing having a first inlet in communication with the outer end of the fluid passageway in the piston rod, an outlet and a through passageway extending from the first inlet to the outlet. A transfer port is provided in a side portion of the passageway, between the first inlet and the outlet. The transfer port has a first side directed toward said passageway and an opposite second side. A valve plug member is provided on the second side of the transfer port. Spring means normally biases the valve plug member into a seated position against the second side of the transfer port. The housing is provided with an opening that is spaced across the passageway from the transfer port. An operator means, connected to the valve plug, extends from the valve plug to and through the opening in the housing. The operator means extends substantially parallel to the piston rod. It has an outer portion which projects outwardly beyond the opening in the housing. The housing also includes a second inlet for fluid delivery to and from the second side of the transfer port. The cylinder housing is provided with an abutment means positioned to contact the outer portion of the operator and move the operator endwise, against the biasing force of the spring means, to move the valve plug away from the transfer port. This allows fluid to flow from the second inlet, through the transfer port, and into and through the passageway to and out from the outlet. When fluid flow is reversed, i.e. the outlet is connected to system pressure and the second inlet is connected to return pressure, the system pressure acts on the valve plug, moving it in opposition to the spring force, to open the transfer port.

In accordance with an aspect of the invention, an end member of a first conduit is placed against the outlet of the housing. A similar end member of a second conduit is placed against the second inlet portion of the housing. A first clamp member is positioned to bear against both of said end members. A second clamp member is positioned against the outer end portion of the piston rod, on the side of the piston rod opposite the transfer valve housing. A plurality of nut and bolt assemblies are interconnected between the two clamp members, for clamping the transfer valve to the end portion of the piston rod.

Other more detailed features of the invention are hereinafter described as a part of the description of the best mode of the invention.

BRIEF DESCRIPTION OF THE DRAWING

Like reference numerals are used to designate like parts throughout the several views of the drawing, and:

FIG. 3 is an end elevational view of the drive assembly shown by FIGS. 1 and 2;

FIG. 4 is an enlarged scale sectional view, taken substantially along line 4—4 of FIG. 1, with some parts being shown in elevation;

FIG. 5 is a sectional view taken substantially along line 5—5 of FIG. 4;

FIG. 6 is a sectional view taken substantially along line 6—6 of FIG. 4;

FIG. 8 is a side elevational view of the transfer valve assembly shown by FIG. 7;

FIG. 9 is a top plan view of the transfer valve assembly, taken substantially along line 19—19 of FIG. 8;

FIG. 10 is a sectional view taken substantially along line 10—10 of FIG. 8;

BEST MODE FOR CARRYING OUT THE INVENTION

Figure 1:
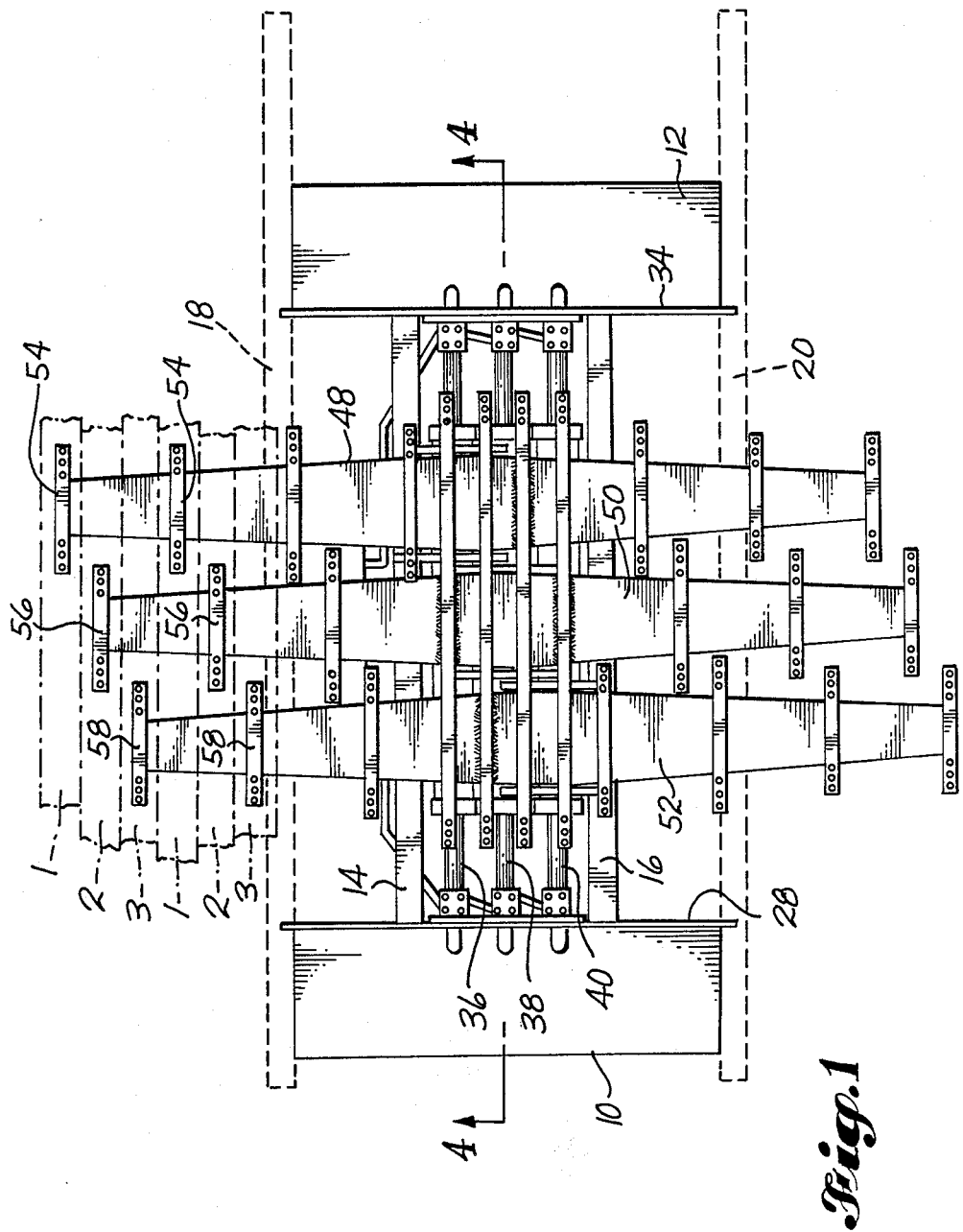
FIG. 1 is a top plan view of a hydraulic drive assembly for use in a reciprocating floor conveyor, with some floor members shown in broken line, with the floor member support and guide system omitted, and with some frame members being shown in line.
Figure 2:
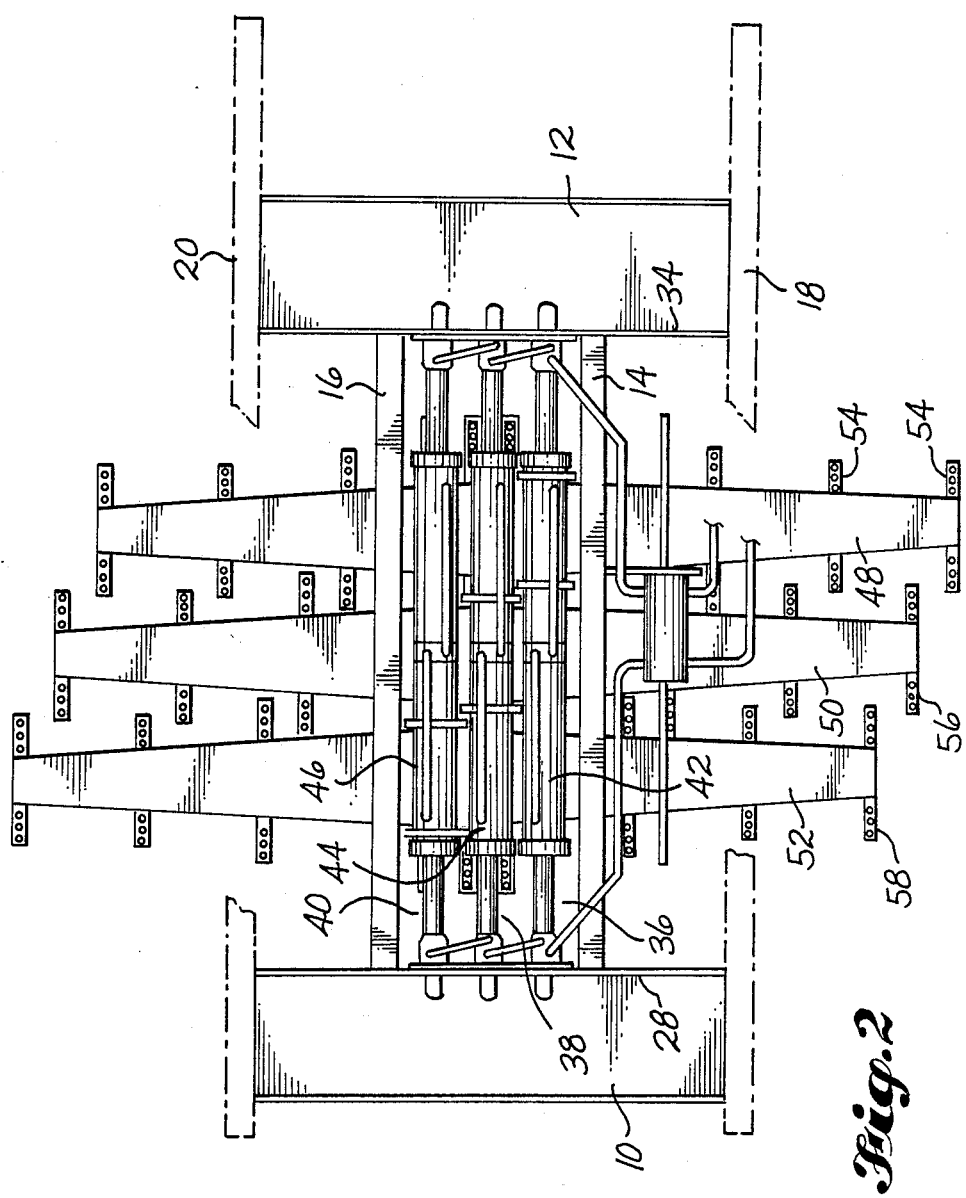
FIG. 2 is a bottom plan view of the assembly shown by FIG. 1.

Referring to FIGS. 1 and 2, the preferred embodiment of the present invention comprises a pair of transverse end frame members 10, 12 and a pair of longitudinal frame members 14, 16 which are connected at their ends to the end members 10, 12. In some installations, the frame members 10, 12, 14, 16 may comprise the entire support frame until such members are incorporated into a truck, trailer, or a stationary installation. In FIGS. 1 and 2 the ends of the frame members 10, 12 are shown connected to side frame members 18, 20 which are shown in broken or phantom lines. In some installations, it is desirable to include these side frame members 18, 20 as a part of the basic frame structure. FIG. 3 shows a typical cross sectional shape of the end frame members 10, 12. For example, frame member 10 may include a relatively large area web 22 having a right angle flange 24 along one of its sides. The opposite side of web 22 may be welded at 26 to the mid part of a plate member 28. In similar fashion, end frame 12 may comprise a large area web 30, a right angle flange 32 extending along one side of the web 30, and a plate 34 to which the opposite side of the web 30 is welded. FIG. 3 illustrates how neatly this type of frame structure can be incorporated into a bed frame for a truck or trailer.

The illustrated embodiment comprises three linear hydraulic motors 36, 38, 40. These motors 36, 38, 40 have stationary pistons and traveling cylinder housings 42, 44, 46. The piston rods have outer ends which are connected to the plates 28, 34, in a manner that is hereinafter described. The cylinder housings 42, 44, 46 travel back and forth on piston heads, as will hereinafter be described. They travel in a space which is defined between the frame plates 28, 34.

Each linear hydraulic motor 36, 38, 40 drives one third of the floor members. Each linear hydraulic motor 36, 38, 40 is connected to a separate transverse drive beam 48, 50, 52. Each transverse drive beam 48, 50, 52 carries a plurality of connector elements, one for each floor slat member that is connected to it.

In FIG. 1 a portion of the floor slat members are shown in broken or phantom line. Specifically, two repetitions of the members are shown. The floor members 1 are shown attached to connectors 54 which are in turn connected to transverse drive beam 48. Floor members 2 are connected to connectors 56 which are in turn connected to transverse drive beam 50. Floor members 3 are connected to connectors 58 which are in turn connected to transverse drive beam 52. This pattern of the floor members is continued across the full width of the installation. As shown by FIG. 1, the connector members which are located in the vicinity of the linear hydraulic motors 36, 38, 40 are made long enough so that they each present end portions outwardly of the ends of the cylinder housings. These end portions include the apertures which receive the bolts or other connectors used to secure the floor members to the connector elements 54, 56, 58, etc.

The linear hydraulic motors 36, 38, 40 are identical in construction. Accordingly, only one of these units will be described, it being understood that the description applies equally as well to the other two units.

Linear hydraulic motor 38 will now be described, with reference to FIGS. 4 and 5:

The motor 38 includes first and second piston rods 60, 62. Piston rod 60 has inner and outer ends. Its outer end 64 is mounted and a piston head 66 is located at its inner end. Piston rod 62 also has inner and outer ends. Its outer end 68 is mounted and it includes a piston head 70 at its inner ends. In a manner to be hereinafter described, the outer ends 64, 68 of the piston rods 60, 62 are secured to the frame plate members 28, 34. As earlier described, the plate members 28, 34 are a part of the end frame members 10, 12. In use, the end frame members 10, 12 are spaced apart and fixed in position. The basic frame may include longitudinal frame members 14, 16 which serve to establish the spacing of the end frame members 10, 12 before the drive assembly is installed.

Returning to FIG. 4, the described manner of mounting the piston rods 60, 62 fixes the piston rods 60, 62 in position relative to each other, with a linear space existing between the piston heads 66, 70.

The cylinder housing 72 travels back and forth on the piston heads 66, 70. Cylinder housing 72 includes a transverse center wall 74. The cylinder housing 72 may be constructed in two sections, with the inner ends of the sections welded to the wall 74.

Cylinder housing 72 includes an end member 76, 78 at each of its ends. Each end member 76, 78 includes a central opening through which the adjoining piston rods 60, 62 extend. In FIG. 4, the central opening in end member 78 is designated 80. The end members 76, 78 carry oil and dirt seals which seal between it and its piston rod 60, 62.

A first fluid chamber 82 is formed within cylinder housing 72 between end member 76 and piston head 66. A second fluid chamber 84, shown in FIG. 4 in a substantially closed position, is formed within cylinder housing 72 between piston head 66 and divider wall 74. A third fluid chamber 86 is defined within cylinder housing 72 between the divider wall 74 and the second piston head 70. A fourth fluid chamber 88 is defined within cylinder housing 72 between the piston head 70 and the second end member 78.

In accordance with an aspect of the invention, chamber 82 is connected with chamber 86 and chamber 84 is connected with chamber 88. This is preferably done by the use of a pair of rigid links of tubing 90, 92. Each link of tubing 90, 92 includes a straight central portion and right angle bent end portions. Tubing 92 is connected at one end to a side portion of cylinder housing 72 at the location of a port 94. The opposite end of tube 90 is connected to a peripheral portion of divider wall 74, at the location of a port 96 (FIG. 5.). Tubing 92 is connected at one end to a peripheral portion of the divider wall 74, at the location of a port 98. The opposite end is connected to a sidewall portion of the cylinder housing, at the location of a port 100. Preferably, the ends of the tubes 90, 92 are secured in place by welding.

Referring to FIG. 5, port 96 is at the outer end of a passageway 102 which extends first radially and then axially. The axial portion 104 communicates with chamber 86. Port 98 communicates with a passageway 106 which extends first radially and then axially. The axial portion 108 communicates with chamber 84.

A fluid passageway extends lengthwise through piston rod 60, from its outer to its inner end. In like fashion, a central passagway 112 extends lengthwise through piston rod 62, from its outer to its inner end. As will hereinafter be described in more detail, there is fluid flow through passageway 110 into and out from chamber 84. There is fluid flow through passageway 112 into and out from chamber 86.

Figure 7:
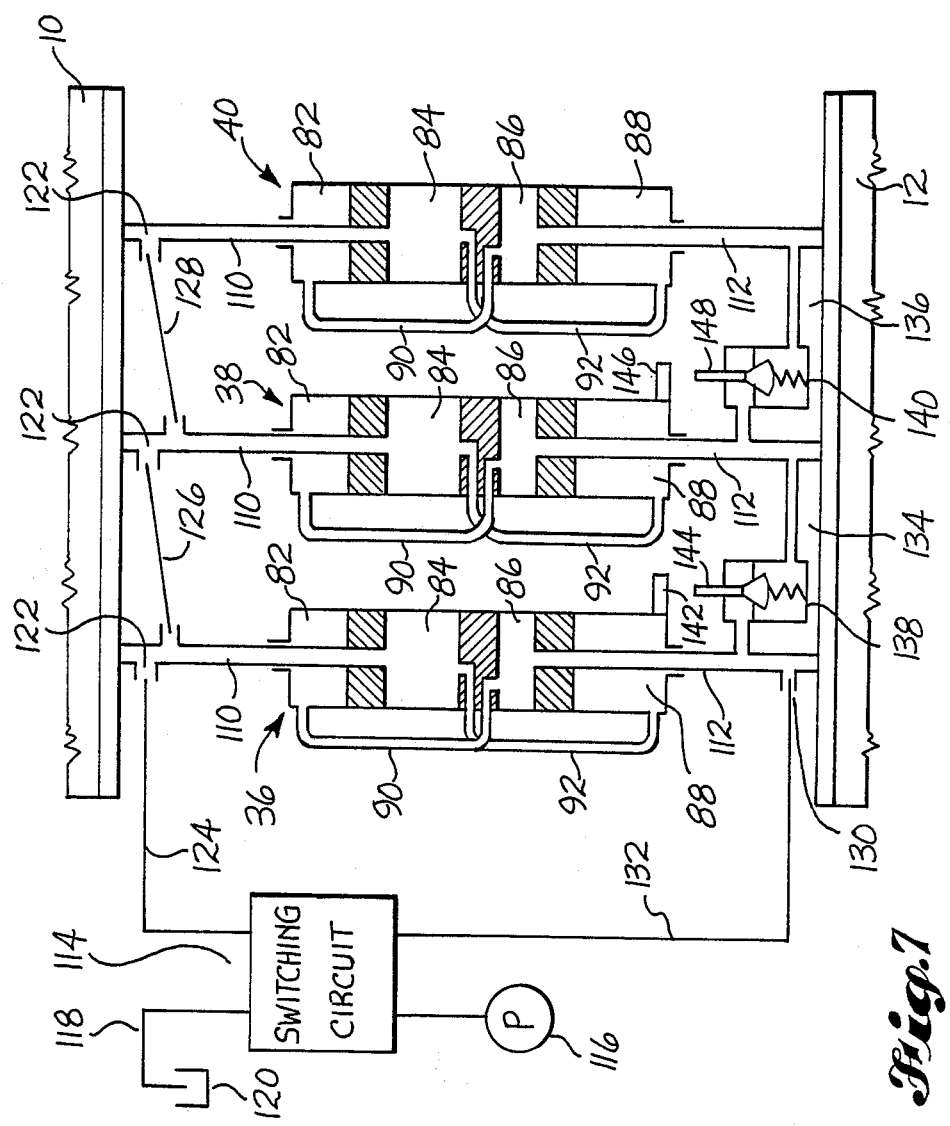
FIG. 7 is a system diagram.
Figure 11:
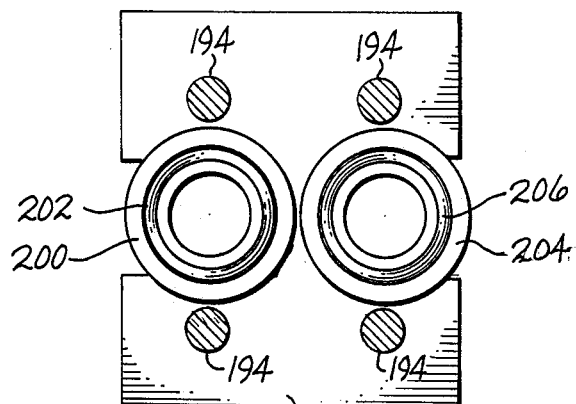
FIG. 11 is a sectional view taken substantially along line 11—11 of FIG. 8.
Figure 12:
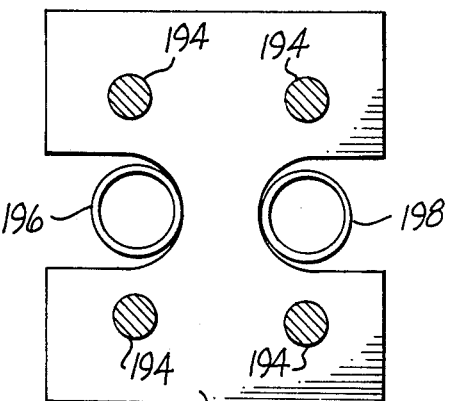
FIG. 12 is a sectional view taken substantially along line 12—12 of FIG. 8.

FIG. 7 is a schematic diagram of the three linear hydraulic motors 36, 38, 40 and other basic parts of the fluid system.

The system includes a switching circuit 114 which reverses the direction of fluid pressure and flow to and from the opposite ends of the linear hydraulic motors 36, 38, 40. The switching circuit is not a part of the invention and may be like the one disclosed in the aforementioned U.S. Pat. No. 4,143,760. Accordingly, the details of the circuit are not illustrated. Hydraulic pressure and flow is provided by a pump 116. The system also includes a return line 118 leading to a storage tank 120. At one end of the drive assembly, ports 122 are provided at the outer ends of the passageways 110. Fluid conduits 124, 126, 128 are interconnected between the switching circuit and these ports 122. Linear hydraulic motor 36 includes a port 130 at the outer end of its passageway 112. A conduit 132 is interconnected between the switching circuit and this port 130. A conduit 134 is interconnected between the passageways 112 of linear hydraulic motors 36, 38. A similar passageway 136 is interconnected between the passageways 112 of linear hydraulic motors 38, 40. A transfer valve 138 is located in conduit 134. A transfer valve 140 is located within conduit 136.

In the course of operation of the system, the switching circuit is operated to send hydraulic pressure and flow via conduit 132 to the port 130. The pressure acts to open transfer valves 138, 140 (they act as check valves) so that the fluid pressure and flow is introduced into all three of the passageways 112. At the same time, switching circuit 114 connects the passageways 110 to return pressure.

The fluid pressure introduced into passageways 112 enters expansible chambers 86 and 82. It enters the chambers 86 first and then flows from chamber 86 through conduits 90 to chambers 82. Introduction of fluid pressure and flow in the chambers 86, 82 causes a movement of all three linear hydraulic motors 36, 38, 40, in unison, from end frame member 12 towards end frame member 10. As they move, the linear hydraulic motors 36, 38, 40 move all of the floor slat members in unison, for advancing the load an amount equal to the stroke of the linear hydraulic motors 36, 38, 40.

At the end of the stroke, the switching circuit is operated to reverse flow through the conduits 132, 124. System pressure is introduced into conduit 124 and conduit 132 is connected to return pressure. System pressure from conduit 124 enters into conduit 126 and conduit 128. Thus, system pressure is introduced into all three of the passageways 110. This pressure is communicated via the passageways 110 to the chambers 84. It is further communicated via the conduits 92 to the chambers 88. The chambers 86, 82 of linear hydraulic motor 36 are communicated to the return line 132. However, at the start of this cycle, the transfer valves 138, 140 are closed. They block flow out from linear hydraulic motors 38, 40. There is no valve in return line 132. Therefore, linear hydraulic motor 36 is moved by the introduction of fluid pressure into chambers 84 and 88, while venting chambers 86, 82. Linear hydraulic motor 36 moves from end frame 10 towards end frame 12 and moves with it one third of the floor members, i.e. members 1 in FIG. 1.

When linear hydraulic motor 36 reaches the end of its stroke an abutment 142 carried at the end of the cylinder housing contacts and depresses an operator 144 which opens the transfer valve 138. Upon opening of transfer valve 138, chambers 86 and 82 in linear hydraulic motor 38 are put into communication with the return line 132 via conduit 90, passageway 112, passageway 134 and port 130. Chambers 84 and 88 are still connected to system pressure. Therefore, linear hydraulic motor 38 moves from end frame 10 towards end frame 12, moving with it the floor members to which it is connected, viz. floor members 2 in FIG. 1.

When linear hydraulic motor 38 approaches the end of its stroke an abutment 146 carried at the end of its cylinder housing makes contact with, and depresses, an operator 148 which opens transfer valve 140. As soon as transfer valve 140 is opened the chambers 86, 82 of linear hydraulic motor 40 are put into communication with the return line 132. Chambers 84 and 88 are still connected to system pressure. Therefore, in response to the opening of transfer valve 140, linear hydraulic motor 40 moves from end frame 10 towards end frame 12, moving with it the floor members to which it is attached, viz. floor members 3 in FIG. 1. When linear hydraulic motor 40 reaches the end of its stroke it triggers the switching valve, to again reverse the direction of pressure and flow to the conduits 132, 124.

Transfer valve 140 will now be described, with reference to FIGS. 8-14.

Figure 13:
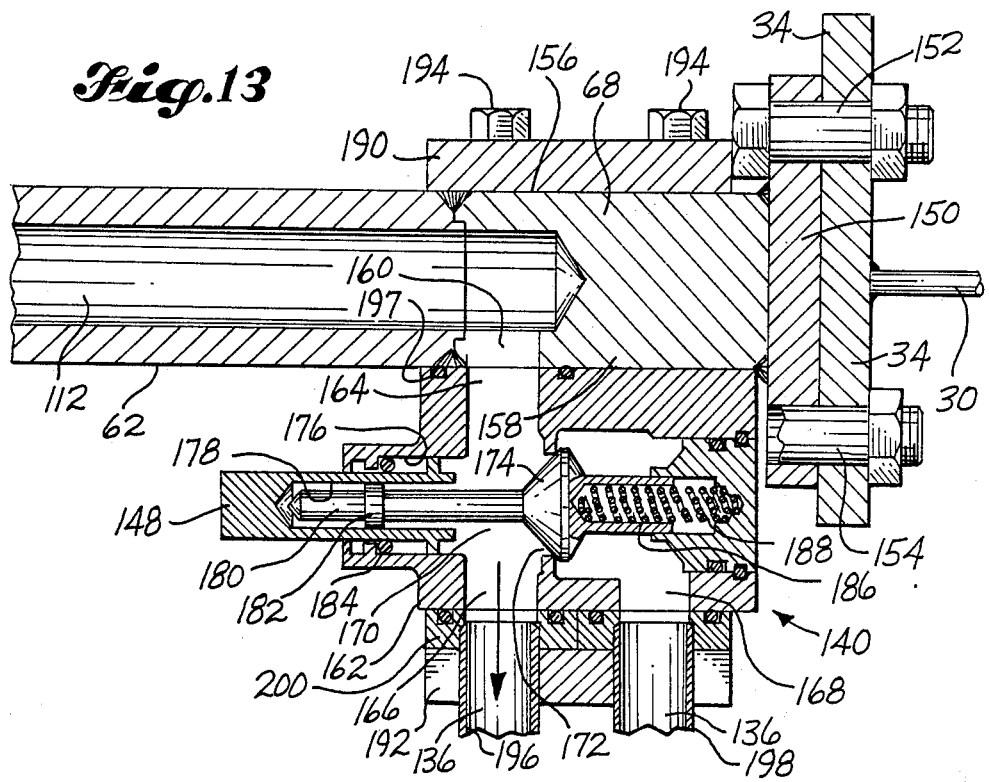
FIG. 13 is an enlarged scale, fragmentary sectional view taken through a transfer valve assembly and one end of a linear hydraulic drive unit, showing the transfer valve in a closed position.

End piece 68 of piston rod 62 is welded at its outer end to a mounting plate 150. Mounting plate 150 is then bolted or otherwise secured to frame member 34. FIGS. 4 and 13 show the use of nut and bolt assemblies 152, 154 extending through the mounting plate 150 and frame plate 34. End piece 68 is formed to include flattened upper and lower surfaces 156, 158. It also includes a side port 160 extending laterally outwardly from fluid passageway 112. Transfer valve 140 includes a housing which is suitably attached to the end piece 68. Housing 162 includes a first inlet port 164, an outlet port 166 and a second inlet port 168. A passageway 170 extends between port 164 and port 166. A sidewall of passageway 170 includes an orifice 172 which is normally closed by a valve plug member 174. An opening is provided in housing 162 opposite the orifice 172. Operator 148 extends through the opening 176, in the manner illustrated. Operator 148 includes a central cavity 178 which receives an elongated stem 180. Stem 180 is connected at its outer end to the valve plug member 174. It includes a main body portion which is substantially smaller in diameter than the cavity 178. It includes an annular enlarged diameter portion 182 intermediate its length. Portion 182 is only slightly smaller in diameter than the cavity 178. An O-ring seal 184 or the like surrounds operator 148 and seals between it and the wall of the opening 176. This arrangement of the operator 148, the stem 180, and the valve plug 174 provides a way of isolating the valve plug 174 from any side loads imposed on the operator 148. In other words, the provision of the enlarged diameter band 182 on the stem 80, and the making of stem 80 in other respects substantially smaller in diameter than the passageway 178, would permit a substantial amount of sideways wiggle of the operator 148 without this motion being transmitted to the valve plug 174.

The end of valve plug 174 opposite the stem 180 includes a tubular extension 186. One end of a spring 188 is received within the tube 186. The opposite end of the spring is received within a well formed in a wall of the housing 162. Spring 188 serves to normally bias valve plug 174 into a seated position in orifice 172.

Figure 14:
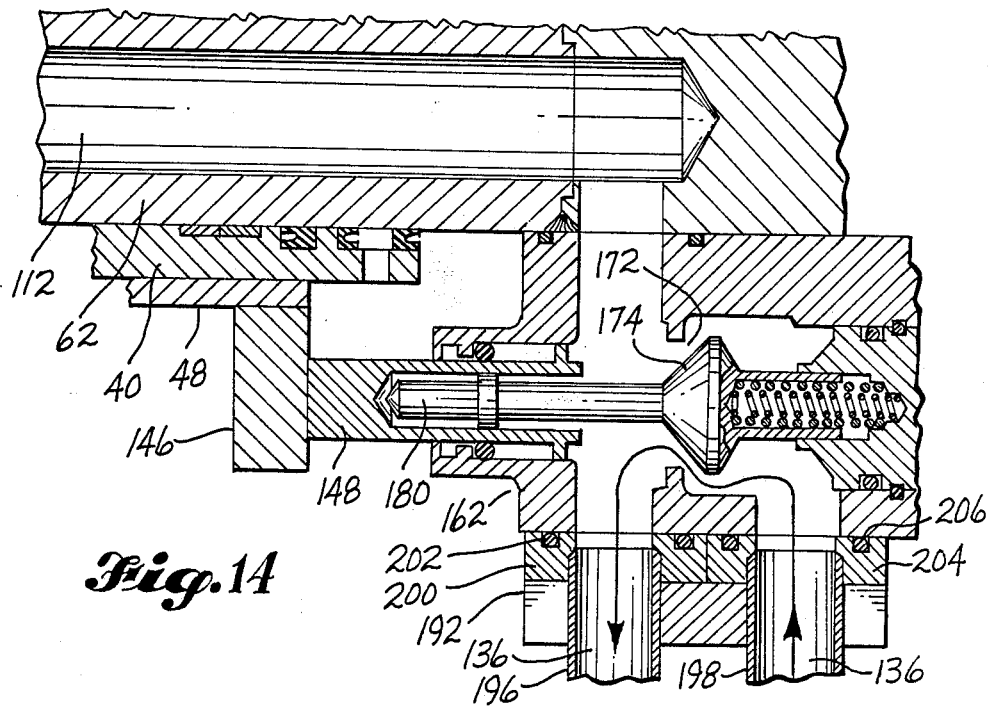
FIG. 14 is a fragmentary view, on yet a larger scale, of a portion of FIG. 13, showing the transfer valve in an open position.

FIG. 14 shows what happens when the abutment 146 carried by the cylinder housing of linear hydraulic motor 38 contacts the operator 148 of transfer valve 140. The operator 148 is depressed. It moves inwardly and exerts a force on stem 180, causing it to move inwardly and move with it the valve plug 174. Valve plug 174 is unseated from the orifice 172. This allows the portion of conduit 136 that is connected to linear hydraulic motor 40 to be in a fluid transfering communication with the portion of conduit 136 that is connected to linear hydraulic motor 38. This allows a retraction of linear hydraulic motor 40 in the manner described above in connection with the system shown by FIG. 7.

Transfer valve 140 may be conveniently attached to the end piece 68 of piston rod 62 by means of a pair of clamp plates 190, 192 and four nut and bolt assemblies 194. A flat surface of valve housing 162 is placed against the flat surface 158 of end piece 68. An O-ring 197 located within an annular groove formed in housing 162 seals against leakage from the region of the ports 160, 162, out from between the housing 162 in end piece 68. Clamp plate 190 rests on the flat surface 156 on end piece 68. The nut and bolt assembly 194 extends from the corner regions of clamp plate 190 to the corner regions of the clamp plate 192. Clamp plate 192 includes a pair of U-shaped recesses for receiving near end portions of U-shaped tubes 196, 198. An annular fitting 200 at the end of tube 196 fits against a flat portion of valve housing 162. An annular groove formed in this end piece 200 holds an O-ring 202 which seals against leakage between valve housing 192 and end piece 200. In similar fashion, an end piece 204 at the end of tube 198 fits against the same flat surface of valve housing 162. End piece 204 includes an annular groove in which an O-ring 206 is received O-ring 206 seals against leakage between end piece 204 and the valve housing 162. The portions of clamp plate 192 bordering the U-shaped recesses in which the tubes 196, 198 are received bears against the end pieces 200, 204, when the nut and bolt assemblies 194 are tightened. As can be appreciated, the above-described construction of the transfer valve, and the manner of its connection to the end piece, make assembly and disassembly quite easy.

The system disclosed by FIG. 7 is a one-way drive. That is, it is designed to move all of the floor members in unison, in one direction only, while returning them, one third at a time, in the opposite direction. As a result, a different type of fitting is provided at the opposite ends of the linear hydraulic motors. The aforementioned U.S. Pat. No. 4,143,760 discloses a two-way or reversible system (see FIG. 4 of that patent). The drive assembly of the present invention can also be arranged to provide a reversible or two-way drive. It is only necessary to provide additional valving and conduits, including a pair of transfer valves at the opposite ends of the linear hydraulic motors 38, 40.

Figure 15:
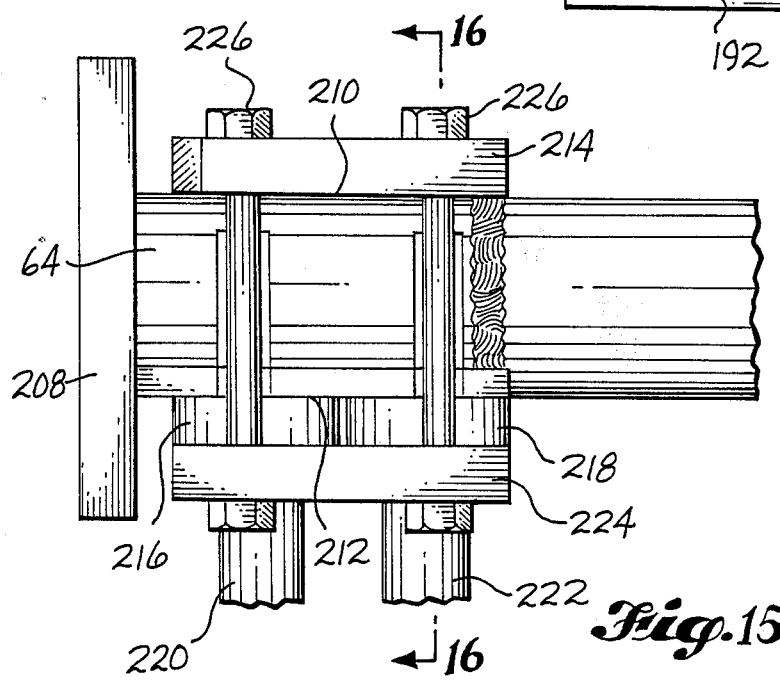
FIG. 15 is a side elevational view of an end portion of a linear hydraulic drive unit which does not include a transfer valve.
Figure 16:
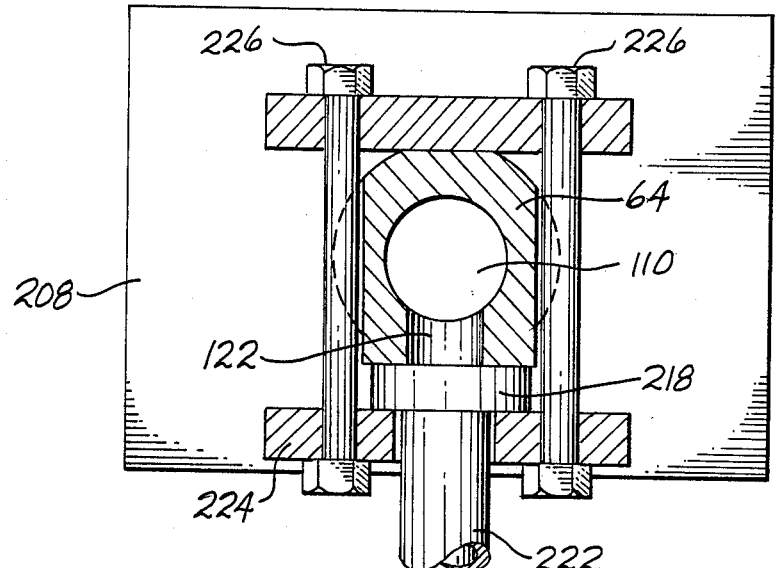
FIG. 16 is a sectional view taken substantially along line 16—16 of FIG. 15.

FIGS. 15 and 16 show an embodiment of the construction of the opposite ends of the linear hydraulic motors in a one-way system. Again, it is linear hydraulic motor 38 that is being illustrated. However, the end construction of linear hydraulic motors 36, 40 is the same.

Referring to FIGS. 15 and 16, end piece 64 is connected (as by welding) at its outer end to a mounting plate 208. It also includes diametrically opposed flat side surfaces 210, 212.

A first clamp plate 214 is positioned on the flap 210. End pieces 216, 218 of two separate U-shaped tubes 220, 222, respectively, are positioned against the flat surface 212. These end pieces 216, 218 are constructed like end pieces 202, 204. They include annular grooves into which O-rings are received, for sealing against leakage against the end pieces 216, 218 and the surface 212. The second clamp plate 224 is located below the end pieces 216, 218. Like clamp plate 192, it includes a pair of opposed U-shaped recesses in which the end portions of the tubes 220, 222 are received. The portion of clamp plate 224 immediately bordering the recesses bears against the end pieces 216, 218. A set of four nut and bolt assemblies 226 are interconnected between the clamp plates 214, 224, and when tightened hold the entire assembly together.

The end piece 68 at the outer end of the piston rod 112 of linear hydraulic motor 40 may include a fitting of the type shown by FIGS. 15 and 16, except that only one tube end is secured to the end piece 68.

Figure 17:
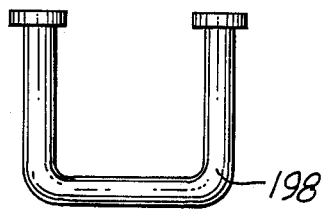
FIG. 17 is a side elevational view of a first U-tube.
Figure 18:
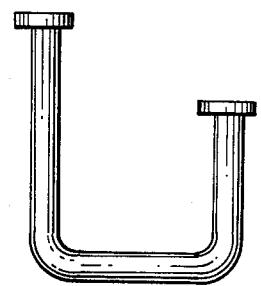
FIG. 18 is a side elevational view of a second U-tube.

FIG. 17 is a side elevational view of a U-shaped tube used at the outer ends of the passageway 110. FIG. 18 is a side elevational view of a U-shaped tube used between the outer end of the passageway 112 in linear hydraulic motor 40 and the second inlet of the transfer valve 140.

In preferred form, the linear hydraulic motors are connected to the transverse drive beams by clamps. The clamps include an upper clamp member attached to the transverse drive beam. The upper clamp member has a lower portion shaped to engage the cylinder housing. A lower clamp member is located below the cylinder housing. It has an upper portion shaped to engage the cylinder housing. Removable connectors (e.g. nut and bolt assemblies) are provided for detachably securing the two clamp members together. Preferably also, the cylinder housing in at least one of the clamp members includes interlocking portions which serve to prevent the cylinder housing from moving longitudinally relative to the clamp member. These may be circumferentially extending ribs formed on a member attached to the cylinder housing and complimentary ribs formed on one of the clamp members. Reference is made to my copending application Ser. No. 477,767 for a more detailed showing and description of this manner of connecting the transverse drive beams to the cylinder housings. The contents of Ser. No. 477,767 is hereby incorporated into this application by this specific reference.

The embodiment that has been illustrated and described is merely an example of the invention. The protection is not to be determined by such embodiment, but only by a proper interpretation of the following claims, including a use of the doctrine of equivalents.

What is claimed is:

1. A linear hydraulic motor, comprising:
   a fixed first piston rod having inner and outer ends;
   a fixed second piston rod having inner and outer ends;
   a first piston head at the inner end of said first piston rod;
   a second piston head at the inner end of said second piston rod;
   said first and second piston heads being spaced apart when in use;
   a cylinder housing mounted to travel on said first and second piston head;
   said cylinder housing having first and second end members;
   said first end member including a central opening through which the first piston rod extends;
   said second end member including a central opening through which the second piston rod extends;
   said cylinder housing including a divider wall between its ends;
   wherein a first fluid chamber is formed within said cylinder housing between said first end member and said first piston head;
   wherein a second fluid chamber is formed within said cylinder housing between said first piston head and the divider wall;
   wherein a third fluid chamber is formed within said cylinder housing between said divider wall and said second piston head;
   wherein a fourth fluid chamber is formed within said cylinder housing between said second piston head and said second end member;
   said divider wall including a first passageway having an inner end communicating with said third fluid chamber, and an outer end;
   said divider wall also including a second passageway having an inner end communicating with said second fluid chamber, and an outer end;
   first conduit means extending through said first piston rod and having an inner end in communication with said second fluid chamber, and an outer end;
   second conduit means interconnected between said first fluid chamber and said third fluid chamber and including said first passageway in said divider wall;
   third conduit means interconnected between said second fluid chamber and the fourth fluid chamber and including said second passageway in the divider wall; and
   fourth conduit means extending through said second piston rod and having an inner end in communication with said third fluid chamber, and an outer end.

2. A linear hydraulic motor according to claim 1, comprising a first mounting pad at the outer end of the first piston rod, and a second mounting pad at the outer end of the second piston rod.

3. A linear hydraulic motor according to claim 2, wherein the outer end of said first conduit means opens laterally of the first piston rod, at a location spaced inwardly from said first mounting pad, and the outer end of said fourth conduit means opens laterally from the second piston rod, at a location spaced inwardly from the second mounting pad.

4. A linear hydraulic motor according to claim 1, wherein said cylinder housing is constructed in two sections, each with an inner end, and said divider wall is a member between the two sections, to which the inner ends of such sections are joined.

5. A linear hydraulic motor according to claim 1, wherein said second and third conduit means comprise sections of rigid tubing welded at their ends to the cylinder housing.

6. A reciprocating floor type conveyor, comprising:
at least three sets of floor slat members which are mounted adjacent to each other for longitudinal reciprocation;
a plurality of transverse drive beams, one for each set of floor slat members, each transverse drive beam including means for connecting it to its set of floor slat members;
a plurality of reversible linear hydraulic drive units, one for each transverse drive beam and the set of floor slat members connected thereto, each said drive unit comprising:
a fixed first piston rod having inner and outer ends;
a fixed second piston rod having inner and outer ends;
a first piston head at the inner end of said first piston rod;
a second piston head at the inner end of said second piston rod;
said first and second piston heads being spaced apart when in use;
a cylinder housing mounted to travel on said first and second piston head;
said cylinder housing having first and second end members;
said first end member including a central opening through which the first piston rod extends;
said second end member including a central opening through which the first piston rod extends;
said cylinder housing including a divider wall between its ends;
wherein a first fluid chamber is formed within said cylinder housing between said first end member and said first piston head;
wherein a second fluid chamber is formed within said cylinder housing between said first piston head and the divider wall;
wherein a third fluid chamber is formed within said cylinder housing between said divider wall and said second piston head;
wherein a fourth fluid chamber is formed within said cylinder housing between said second piston head and said second end member;
said divider wall including a first passageway having an inner end communicating with said third chamber and an outer end;
said divider wall also including a second passageway having an inner end communicating with said second chamber, and an outer end;
first conduit means extending through said first piston rod and having an inner end in communication with said second chamber, and an outer end;
second conduit means interconnected between said first chamber and the said third chamber and including the first passageway in said divider wall;
third conduit means interconnected between said second chamber and said fourth chamber and including said second passageway in said divider wall;
fourth conduit means extending through said second piston rod and having an inner end in communication with said third chamber and an outer end;
said drive units being positioned to place said cylinder housings directly below the transverse drive beams;
means for connecting each cylinder housing to a related transverse drive beam; and
wherein in use said transverse drive beams are driven by said drive units back and forth within a space which is between the outer ends of the piston rods.

7. A reciprocating floor type conveyor according to claim 6, including means for detachably connecting each transverse drive beam to its cylinder housing.

8. A reciprocating floor type conveyor according to claim 7, wherein the means for detachably connecting each transverse drive beam to its cylinder housing comprises an upper clamp member attached to the transverse drive beam and having a lower portion shaped to engage the cylinder housing, a lower clamp member having an upper portion shaped to engage the cylinder housing, and removable connectors for detachably securing the two clamp members together.

9. A reciprocating floor type conveyor according to claim 8, wherein the cylinder housing and at least one of the clamp members includes interlocking portions which serve to prevent the cylinder housing from moving longitudinally relative to the clamp members.

10. A reciprocating floor conveyor according to claim 6, further comprising a first transverse frame member located outwardly adjacent the outer ends of the first piston rods, a second transverse frame member positioned outwardly adjacent the outer ends of the second piston rods, and means for detachably securing the outer ends of the piston rods to said transverse frame members.

11. A reciprocating floor type conveyor according to claim 10, further comprising at least two longitudinal frame members interconnected between the transverse frame members, outwardly on opposite sides of the plurality of drive units.

12. A linear hydraulic motor, comprising:
a fixed first piston rod having inner and outer ends;
a fixed second piston rod having inner and outer ends;
a first piston head at the inner end of said first piston rod;
a second piston head at the inner end of said second piston rod;
said first and second piston heads being spaced apart when in use;
a cylinder housing mounted to travel on said first and second piston head;
said cylinder housing having first and second end members;
said first end member including a central opening through which the first piston rod extends;
said second end member including a central opening through which the second piston rod extends;
said cylinder housing including a divider wall between its ends;
wherein a first fluid chamber is formed within said cylinder housing between said first end member and said first piston head;
wherein a second fluid chamber is formed within said cylinder housing between said first piston head and the divider wall;

wherein a third fluid chamber is formed within said cylinder housing between said divider wall and said second piston head;

wherein a fourth fluid chamber is formed within said cylinder housing between said second piston head and said second end member;

first conduit means extending through said first piston rod and having an inner end in communication with said second fluid chamber, at an outer end;

second conduit means interconnected between said first fluid chamber and said third fluid chamber;

third conduit means interconnected between said second fluid chamber and said fourth fluid chamber; and fourth conduit means extending through said second piston rod and having an inner end in communication with said third fluid chamber and an outer end.

13. A linear hydraulic motor according to claim 12, wherein said second and third conduit means comprise sections of rigid tubing.

14. A reciprocating floor type conveyor, comprising:
at least three sets of floor slat members which are mounted adjacent to each other for longitudinal reciprocation;
a plurality of transverse drive beams, one for each set of floor slat members, each transverse drive beam including means for connecting it to its set of floor slat members;
a plurality of reversible linear hydraulic drive units, one for each transverse drive beam and the set of floor slat members connected thereto, each said drive unit comprising:
a fixed first piston rod having inner and outer ends;
a fixed second piston rod having inner and outer ends;
a first piston head at the inner end of said first piston rod;
a second piston head at the inner end of said second piston rod;
said first and second piston heads being spaced apart when in use;
a cylinder housing mounted to travel on said first and second piston head;
said cylinder housing having first and second end members;
said first end member including a central opening through which the first piston rod extends;
said cylinder housing including a divider wall between its ends;
wherein a first fluid chamber is formed within said cylinder housing between said first end member and said first piston head;
wherein a second fluid chamber is formed within said cylinder housing between said first piston head and the divider wall;
wherein a third fluid chamber is formed within said cylinder housing between said divider wall and said second piston head;
wherein a fourth fluid chamber is formed within said cylinder housing between said second piston head and said second end member;
first conduit means extending through said first piston rod and having an inner end in communication with said second chamber, at an outer end;
second conduit means interconnected between said first chamber and said third chamber;
third conduit means interconnected between said second chamber and said fourth chamber;
fourth conduit means extending through said second piston rod and having an inner end in communication with said third chamber and an outer end;
said drive units being positioned to place said cylinder housings directly below the transverse drive beams;
means for connecting each cylinder housing to a related transverse drive beam; and
wherein in use said transverse drive beams are driven by said drive units back and forth within a space which is between the outer ends of the piston rods.

15. A reciprocating floor conveyor according to claim 14, located outwardly adjacent the outer ends of the first piston rods, a second transverse frame member positioned outwardly adjacent the outer ends of the second piston rods, means for detachably securing the outer ends of the piston rods to said transverse frame members, and at least two longitudinal frame members interconnected between the transverse frame members, outwardly on opposite sides of the plurality of drive units.

16. A reciprocating floor conveyor according to claim 15, wherein the second and third conduit means comprise metal tubing and each has a straight central section which extends along the cylinder housing and ninety degree end sections which are connected to the cylinder housing.

* * * * *

UNITED STATES PATENT AND TRADEMARK OFFICE
CERTIFICATE OF CORRECTION

PATENT NO. : 4,821,868
DATED : April 18, 1989
INVENTOR(S) : Raymond K. Foster

It is certified that error appears in the above-identified patent and that said Letters Patent is hereby corrected as shown below:

Column 1, line 13, "developement" should be -- development --.
Column 1, line 20, "is" should be -- has --.
Column 3, line 17, after "port", there should be a period.
Column 3, line 54, after "in", add -- broken --.
Column 4, line 2, "line 19--19" should be -- line 9--9 --.
Column 8, in both lines 12 and 13, "80" should be -- 180 --.
Column 8, line 58, there should be a period after "received".
Column 9, line 32, there should be a period after "received".
Column 9, line 62, "complimentary" should be "complementary".
Claim 6, column 11, line 38, "first" should be -- second --.
Claim 14, after line 49, add:
 -- said second end member including a central opening through which the second piston rod extends; --

Signed and Sealed this

Twenty-fourth Day of April, 1990

Attest:

HARRY F. MANBECK, JR.

*Attesting Officer*     *Commissioner of Patents and Trademarks*